United States Patent
Sturgin et al.

(10) Patent No.: US 9,217,498 B2
(45) Date of Patent: Dec. 22, 2015

(54) MULTI-FUNCTION TORQUE CONVERTER WITH A SEALED IMPELLER CLUTCH APPLY CHAMBER AND METHOD OF FORMING AND OPERATING A MULTI-FUNCTION TORQUE CONVERTER

(75) Inventors: Todd Sturgin, Shreve, OH (US); Vural Ari, Wooster, OH (US)

(73) Assignee: Schaeffler Technologies AG & Co., KG, Herzogenaurach (DE)

( * ) Notice: Subject to any disclaimer, the term of this patent is extended or adjusted under 35 U.S.C. 154(b) by 1689 days.

(21) Appl. No.: 12/070,013

(22) Filed: Feb. 14, 2008

(65) Prior Publication Data

US 2008/0202882 A1  Aug. 28, 2008

Related U.S. Application Data

(60) Provisional application No. 60/903,795, filed on Feb. 27, 2007.

(51) Int. Cl.
  *F16H 45/02* (2006.01)
  *F16F 15/123* (2006.01)
  *F16D 25/0638* (2006.01)
  *F16H 45/00* (2006.01)

(52) U.S. Cl.
  CPC ............ *F16H 45/02* (2013.01); *F16D 25/0638* (2013.01); *F16H 2045/002* (2013.01); *F16H 2045/0252* (2013.01); *F16H 2045/0278* (2013.01); *F16H 2045/0284* (2013.01)

(58) Field of Classification Search
  CPC .................. F16H 2045/002; F16H 2045/0252
  USPC ........... 192/3.25, 3.26, 3.28, 3.29, 3.3, 55.61, 192/212
  See application file for complete search history.

(56) References Cited

U.S. PATENT DOCUMENTS

| | | | | |
|---|---|---|---|---|
| 3,537,262 A | * | 11/1970 | Briski | 60/341 |
| 3,820,417 A | * | 6/1974 | Allen | 475/65 |
| 4,966,261 A | * | 10/1990 | Kohno et al. | 192/3.29 |
| 5,121,821 A | * | 6/1992 | Poorman et al. | 192/3.28 |
| 5,613,581 A | * | 3/1997 | Fonkalsrud et al. | 192/3.23 |
| 6,112,869 A | * | 9/2000 | Krause et al. | 192/3.29 |
| 6,494,303 B1 | | 12/2002 | Reik et al. | |
| 2004/0188207 A1 | * | 9/2004 | Leber | 192/3.25 |
| 2004/0188208 A1 | * | 9/2004 | Leber | 192/3.25 |
| 2006/0185954 A1 | * | 8/2006 | Rebholz | 192/3.29 |
| 2007/0074943 A1 | | 4/2007 | Hemphill et al. | |
| 2008/0149441 A1 | * | 6/2008 | Sturgin | 192/3.25 |
| 2008/0149442 A1 | | 6/2008 | Sturgin | |
| 2008/0156608 A1 | | 7/2008 | Kombowski | |

* cited by examiner

*Primary Examiner* — Robert Hodge
*Assistant Examiner* — Terry Chau
(74) *Attorney, Agent, or Firm* — Simpson & Simpson, PLLC

(57) ABSTRACT

A torque converter including: a sealed liquid-tight fluid-containing chamber; an impeller clutch; and at least one piston for the clutch forming a part of the chamber. A torque converter including: first and second fluid-containing chambers; a torque converter clutch; a piston plate for the clutch having a one-way opening and forming part of the first chamber. The first chamber is liquid-tight for pressure levels greater than in the second chamber. During torque converter mode, fluid flows from a torus through the second chamber and one-way opening into the first chamber. A multi-function torque converter including: an impeller clutch; at least one impeller piston plate; a plate; and a fluid-containing chamber. The chamber is at least partially formed by a combination of one or more of the impeller plates and the plate and the combination is at least indirectly connected to balance axial forces generated by pressurization of the chamber.

9 Claims, 10 Drawing Sheets

US 9,217,498 B2

MULTI-FUNCTION TORQUE CONVERTER WITH A SEALED IMPELLER CLUTCH APPLY CHAMBER AND METHOD OF FORMING AND OPERATING A MULTI-FUNCTION TORQUE CONVERTER

CROSS-REFERENCE TO RELATED APPLICATIONS

This application claims the benefit under 35 U.S.C. §119 (e) of U.S. Provisional Application No. 60/903,795 filed on Feb. 27, 2007 which application is incorporated herein by reference.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a multi-function torque converter with one or both of a sealed piston for a torque converter clutch or a sealed piston for an impeller clutch.

BACKGROUND OF THE INVENTION

FIG. 1 illustrates a general block diagram showing the relationship of the engine 7, torque converter 10, transmission 8, and differential/axle assembly 9 in a typical vehicle. It is well known that a torque converter is used to transmit torque from an engine to a transmission of a motor vehicle.

The three main components of the torque converter are the pump 37, turbine 38, and stator 39. The torque converter becomes a sealed chamber when the pump is welded to cover 11. The cover is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch 49 is supplied by an additional pump in the transmission that is driven by the pump hub.

In torque converter 10 a fluid circuit is created by the pump (sometimes called an impeller), the turbine, and the stator (sometimes called a reactor). The fluid circuit allows the engine to continue rotating when the vehicle is stopped, and accelerate the vehicle when desired by a driver. The torque converter supplements engine torque through torque ratio, similar to a gear reduction. Torque ratio is the ratio of output torque to input torque. Torque ratio is highest at low or no turbine rotational speed (also called stall). Stall torque ratios are typically within a range of 1.8-2.2. This means that the output torque of the torque converter is 1.8-2.2 times greater than the input torque. Output speed, however, is much lower than input speed, because the turbine is connected to the output and it is not rotating, but the input is rotating at engine speed.

Turbine 38 uses the fluid energy it receives from pump 37 to propel the vehicle. Turbine shell 22 is connected to turbine hub 19. Turbine hub 19 uses a spline connection to transmit turbine torque to transmission input shaft 43. The input shaft is connected to the wheels of the vehicle through gears and shafts in transmission 8 and axle differential 9. The force of the fluid impacting the turbine blades is output from the turbine as torque. Axial thrust bearings 31 support the components from axial forces imparted by the fluid. When output torque is sufficient to overcome the inertia of the vehicle at rest, the vehicle begins to move.

After the fluid energy is converted to torque by the turbine, there is still some energy left in the fluid. The fluid exiting from small radial outlet 44 would ordinarily enter the pump in such a manner as to oppose the rotation of the pump. Stator 39 is used to redirect the fluid to help accelerate the pump, thereby increasing torque ratio. Stator 39 is connected to stator shaft 45 through one-way clutch 46. The stator shaft is connected to transmission housing 47 and does not rotate. One-way clutch 46 prevents stator 39 from rotating at low speed ratios (where the pump is spinning faster than the turbine). Fluid entering stator 39 from turbine outlet 44 is turned by stator blades 48 to enter pump 37 in the direction of rotation.

The blade inlet and exit angles, the pump and turbine shell shapes, and the overall diameter of the torque converter influence its performance. Design parameters include the torque ratio, efficiency, and ability of the torque converter to absorb engine torque without allowing the engine to "run away." This occurs if the torque converter is too small and the pump can't slow the engine.

At low speed ratios, the torque converter works well to allow the engine to rotate while the vehicle is stationary, and to supplement engine torque for increased performance. At speed ratios less than 1, the torque converter is less than 100% efficient. The torque ratio of the torque converter gradually reduces from a high of about 1.8 to 2.2, to a torque ratio of about 1 as the turbine rotational speed approaches the pump rotational speed. The speed ratio when the torque ratio reaches 1 is called the coupling point. At this point, the fluid entering the stator no longer needs redirected, and the one way clutch in the stator allows it to rotate in the same direction as the pump and turbine. Because the stator is not redirecting the fluid, torque output from the torque converter is the same as torque input. The entire fluid circuit will rotate as a unit.

Peak torque converter efficiency is limited to 92-93% based on losses in the fluid. Therefore torque converter clutch 49 is employed to mechanically connect the torque converter input to the output, improving efficiency to 100%. Clutch piston plate 17 is hydraulically applied when commanded by the transmission controller. Piston plate 17 is sealed to turbine hub 19 at its inner diameter by o-ring 18 and to cover 11 at its outer diameter by friction material ring 51. These seals create a pressure chamber and force piston plate 17 into engagement with cover 11. This mechanical connection bypasses the torque converter fluid circuit.

The mechanical connection of torque converter clutch 49 transmits many more engine torsional fluctuations to the drivetrain. As the drivetrain is basically a spring-mass system, torsional fluctuations from the engine can excite natural frequencies of the system. A damper is employed to shift the drivetrain natural frequencies out of the driving range. The damper includes springs 15 in series with engine 7 and transmission 8 to lower the effective spring rate of the system, thereby lowering the natural frequency.

Torque converter clutch 49 generally comprises four components: piston plate 17, cover plates 12 and 16, springs 15, and flange 13. Cover plates 12 and 16 transmit torque from piston plate 17 to compression springs 15. Cover plate wings 52 are formed around springs 15 for axial retention. Torque from piston plate 17 is transmitted to cover plates 12 and 16 through a riveted connection. Cover plates 12 and 16 impart torque to compression springs 15 by contact with an edge of a spring window. Both cover plates work in combination to support the spring on both sides of the spring center axis. Spring force is transmitted to flange 13 by contact with a flange spring window edge. Sometimes the flange also has a rotational tab or slot which engages a portion of the cover plate to prevent over-compression of the springs during high torque events. Torque from flange 13 is transmitted to turbine hub 19 and into transmission input shaft 43.

Energy absorption can be accomplished through friction, sometimes called hysteresis, if desired. Hysteresis includes friction from windup and unwinding of the damper plates, so it is twice the actual friction torque. The hysteresis package generally consists of diaphragm (or Belleville) spring 14 which is placed between flange 13 and one of cover plates 16 to urge flange 13 into contact with the other cover plate 12. By controlling the amount of force exerted by diaphragm spring 14, the amount of friction torque can also be controlled. Typical hysteresis values are in the range of 10-30 Nm.

The use of an unsealed impeller piston in a torque converter is known. However, the controllability and responsiveness of such a piston are lessened due to the hydro-dynamic effects from surrounding components in the torque converter in fluid communication with the piston.

Axial forces are generated in a torque converter by the pressurization of chambers for operation of impeller or torque converter clutches. Unfortunately, these axial forces can impinge on housing components or bearings in the torque converter, requiring an increase in the duty rating or load-bearing capacity of the components and bearings, which in turn, undesirably increases the cost, weight, and complexity of the torque converter.

During operation in torque converter mode for a torque converter with an impeller clutch and a torque converter clutch, it is necessary to maintain a minimum pressure differential on the piston for the impeller clutch to maintain the desired torque-carrying capacity for the clutch. Further, it is desirable to increase cooling of the torus. Unfortunately, increasing cooling for the torus can lead to a decrease in the pressure differential.

Thus, there is a long-felt need, in a torque converter having an impeller clutch and a torque converter clutch: a means of increasing controllability and responsiveness for a piston plate for the impeller clutch; a means for protecting housing components and bearings from axial loads associated with operating piston plates; and a means for increasing cooling flow for a torus, in torque converter mode, while maintaining an adequate pressure differential for an impeller piston plate.

BRIEF SUMMARY OF THE INVENTION

The present invention broadly comprises a multi-function torque converter including: an impeller clutch arranged to transmit torque from a torque input for the torque converter to an impeller for the torque converter; at least one impeller piston plate for the impeller clutch; and a sealed fluid-containing chamber, the sealed chamber liquid-tight with the exception of a channel arranged for connection to a pump. The at least one impeller piston plate forms a first portion of the sealed chamber. In some aspects, the torque converter is arranged to balance first and second axial forces, respectively, generated by pressurization of the sealed chamber. In some aspects, the multi-function torque converter includes a plate, the plate forms a second portion of the sealed chamber and the plate and the at least one impeller plate are arranged to balance the first and second axial forces, respectively. In some aspects, the multi-function torque converter includes a connecting element, the plate is connected to the connecting element, and the at least one impeller plate is arranged to transmit the second axial force through the impeller clutch to the connecting element. In some aspects, the at least one impeller plate comprises first and second impeller plates arranged to balance the first and second axial forces, respectively. In some aspects, the multi-function torque converter includes respective pluralities of housing components and bearings and the chamber is arranged to isolate the respective pluralities of housing components and bearings from axial force generated by pressure in the chamber.

In some aspects, the multi-function torque converter includes a torus, at least one fluid-containing chamber, and a fluid circulation path passing through the torus and the least one fluid-containing chamber. In a torque converter mode for the torque converter, a pressure difference between the sealed chamber and the least one fluid-containing chamber operates to close the impeller clutch with a specified torque carrying capacity and the torque converter is arranged to maintain the pressure difference as fluid flows through the fluid circulation path. In some aspects, the multi-function torque converter includes a torus and a fluid circulation path passing through the torus and the fluid circulation path is isolated from the sealed chamber.

The present invention also broadly comprises a multi-function torque converter including: a torque converter clutch arranged to transmit torque from the torque input to a turbine for the torque converter; a lock-up piston plate for the torque converter clutch, the lock-up piston plate having a one-way opening; a first fluid-containing chamber; and at least one second fluid-containing chamber. The first chamber is liquid-tight for a pressure level in the first chamber greater than a pressure level in the at least one second chamber, with the exception of a channel arranged for fluid communication with a pump. The lock-up piston plate forms a first portion of the first fluid-containing chamber and during operation of the torque converter in torque converter mode, fluid flows from a torus for the torque converter through the at least one second chamber and through the one-way opening into the first chamber. In some aspects, the one-way opening is a check valve.

In some aspects, the multi-function torque converter includes an impeller clutch arranged to transmit torque from the torque input to an impeller for the torque converter and at least a portion of a radial extent of the torque converter clutch is axially aligned with the impeller clutch. In some aspects, the torque converter includes an impeller piston plate for the impeller clutch and the first chamber is arranged to generate an axial force on the impeller plate when pressurized and a pressure differential between the first chamber and the at least one second chamber balances the axial force. In general, the multi-function torque converter includes respective pluralities of housing components and bearings and in some aspects, the torque converter is arranged such that balancing the axial force by the pressure differential isolates the respective pluralities of housing components and bearings from the axial force.

The present invention further broadly comprises a multi-function torque converter including: an impeller clutch arranged to transmit torque from a cover for the torque converter to an impeller for the torque converter; at least one impeller piston plate for the impeller clutch; a plate; and a fluid-containing chamber. The chamber is at least partially formed by a combination of one or more of the at least one impeller plate and the plate, the chamber is arranged to be pressurized to engage the impeller clutch, and the combination of one or more of the at least one impeller plate and the plate is at least indirectly connected to balance axial forces generated by pressurization of the chamber.

The present invention broadly comprises methods for forming and operating a multi-function torque converter.

It is a general object of the present invention to provide a multi-function torque converter with a sealed impeller piston plate.

It is another general object of the present invention to provide a multi-function torque converter that isolates axial forces due to operation of piston plates from housing components and bearings.

It is yet another general object of the present invention to provide a multi-function torque converter that, in torque converter mode, maintains an adequate pressure differential for an impeller piston plate while providing increased cooling flow for the torus.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
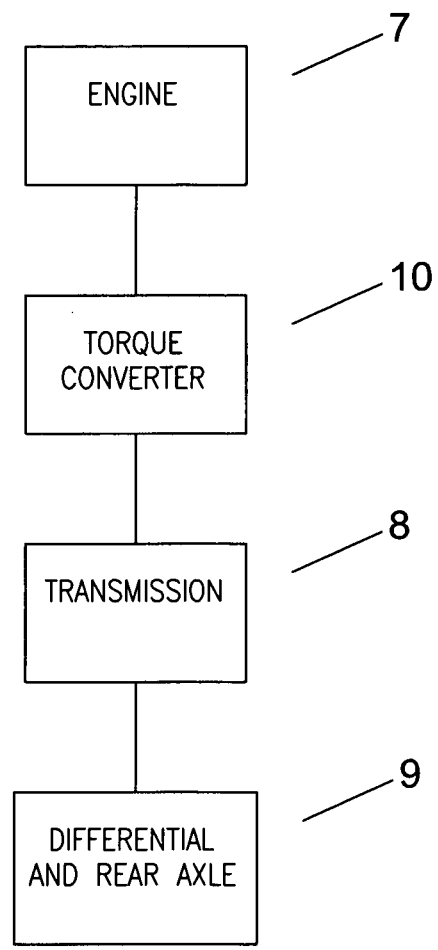
FIG. 1 is a general block diagram illustration of power flow in a motor vehicle, intended to help explain the relationship and function of a torque converter in the drive train thereof.
Figure 2:
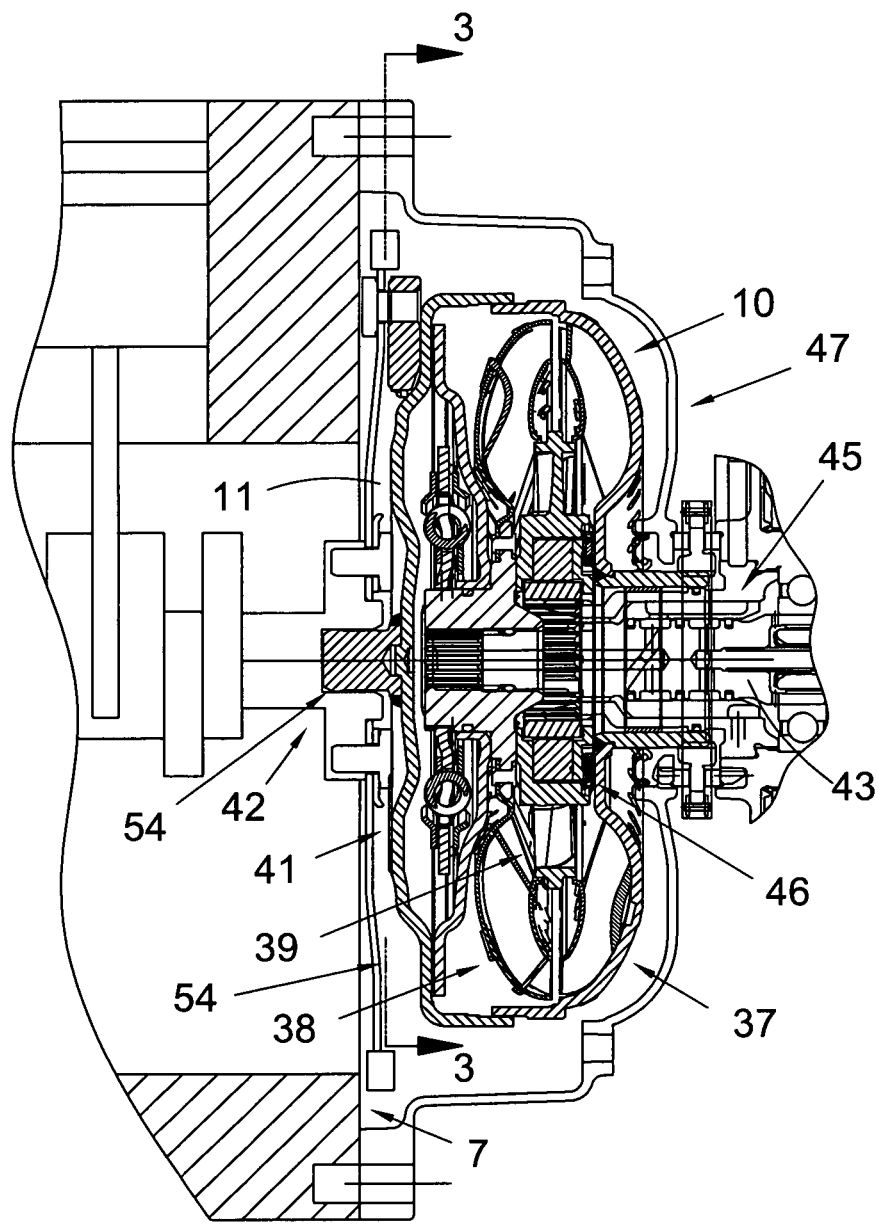
FIG. 2 is a cross-sectional view of a prior art torque converter, shown secured to an engine of a motor vehicle.
Figure 3:
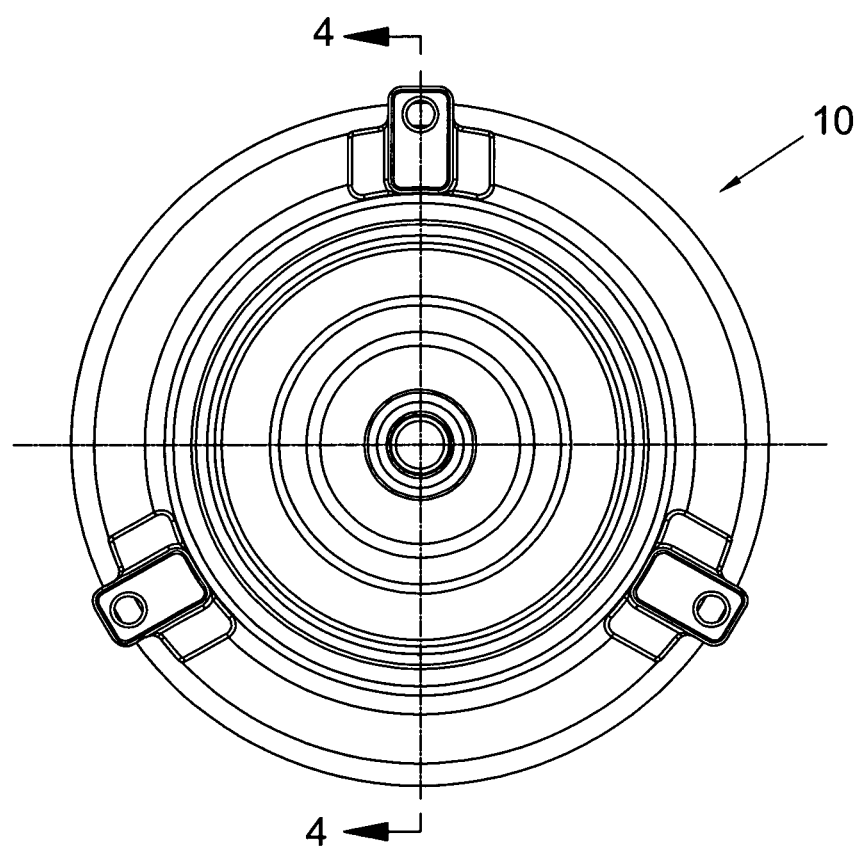
FIG. 3 is a left view of the torque converter shown in FIG. 2, taken generally along line 3-3 in FIG. 2.
Figure 4:
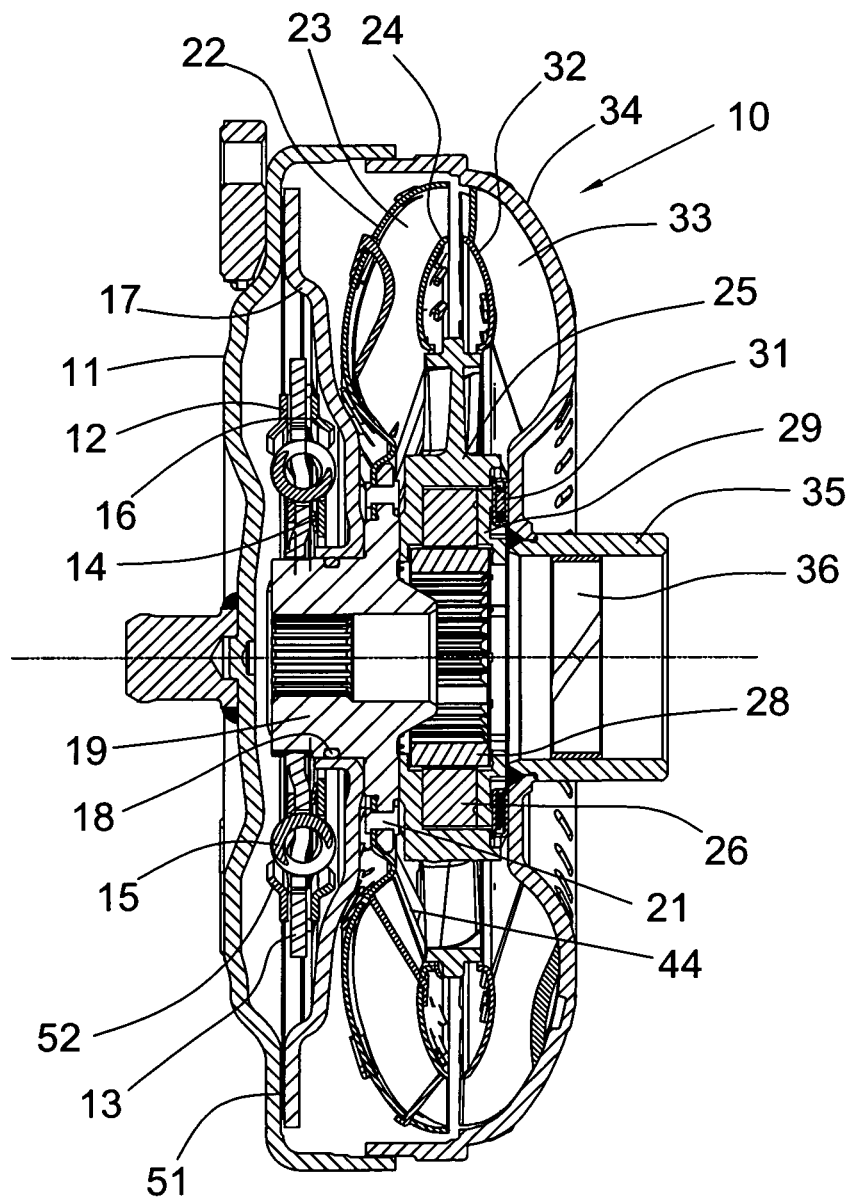
FIG. 4 is a cross-sectional view of the torque converter shown in FIGS. 2 and 3, taken generally along line 4-4 in FIG. 3.
Figure 5:
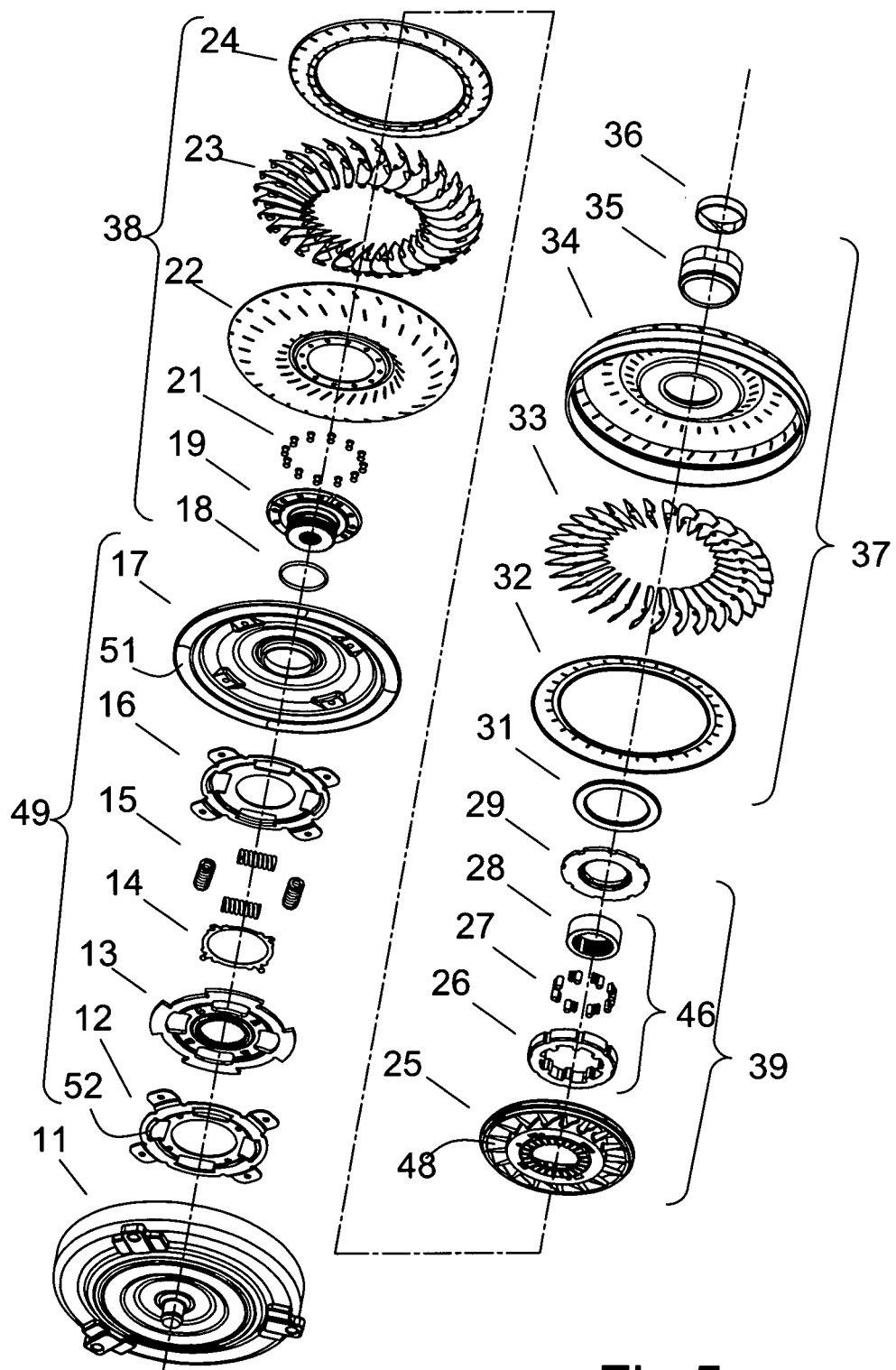
FIG. 5 is a first exploded view of the torque converter shown in FIG. 2, as shown from the perspective of one viewing the exploded torque converter from the left.
Figure 6:
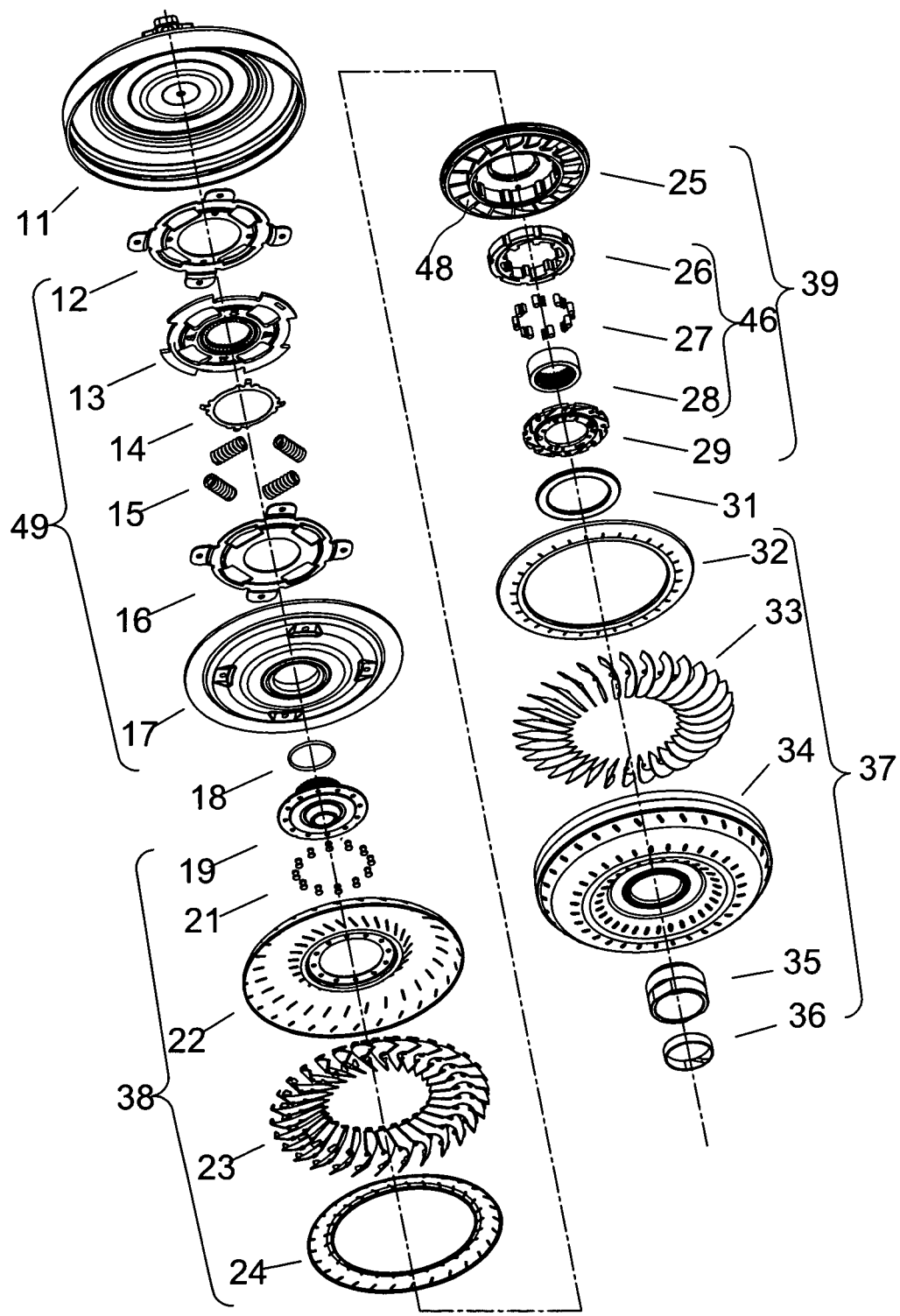
FIG. 6 is a second exploded view of the torque converter shown in FIG. 2, as shown from the perspective of one viewing the exploded torque converter from the right.
Figure 7A:
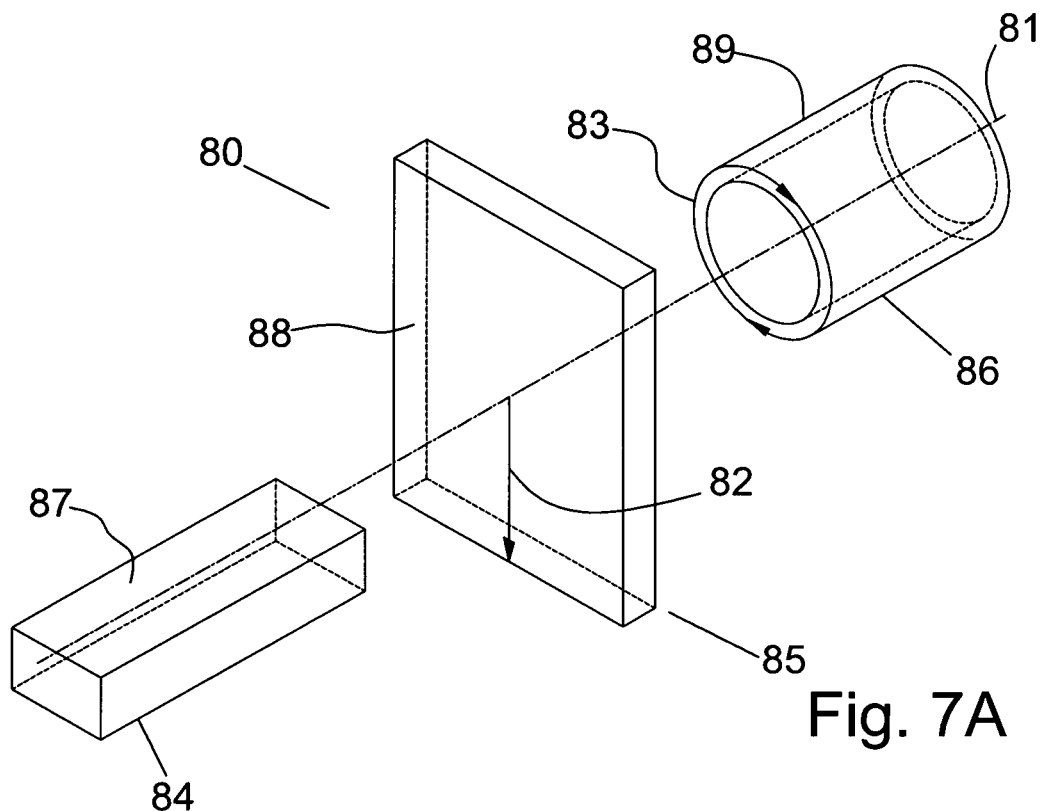
FIG. 7A is a perspective view of a cylindrical coordinate system demonstrating spatial terminology used in the present application.

FIG. 7A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), or circumference 83, respectively. The adjectives "axial," "radial" and "circumferential" refer to orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" refer to an orientation parallel to axis 81, radius 82, or circumference 83, respectively. The adverbs "axially," "radially," and "circumferentially" refer to an orientation parallel to respective planes.

Figure 7B:
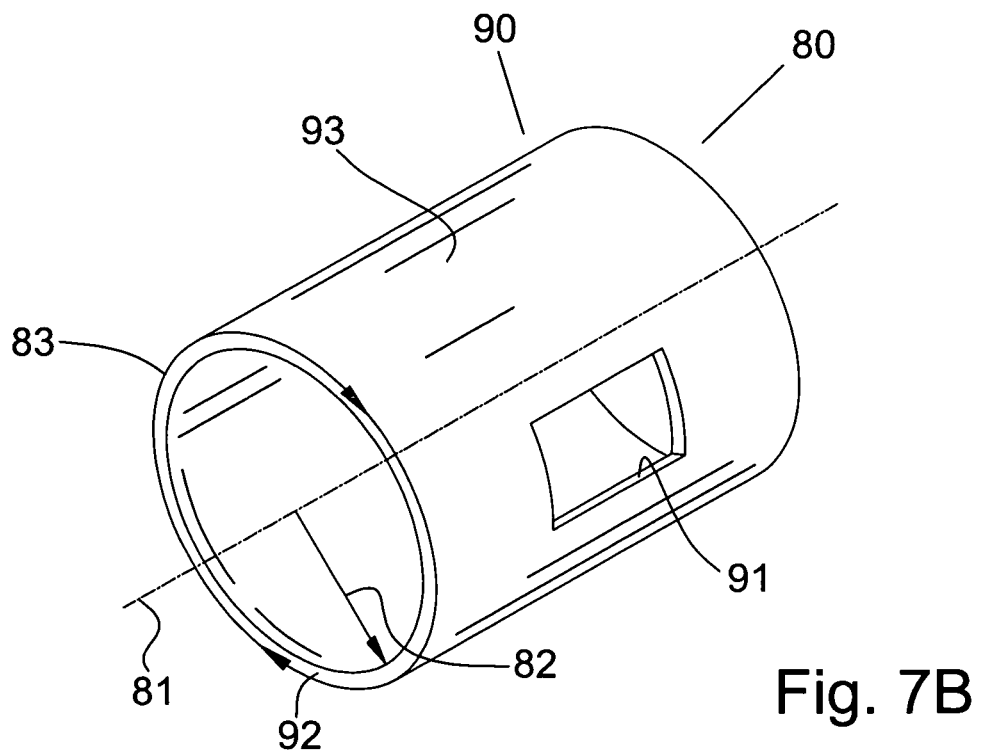
FIG. 7B is a perspective view of an object in the cylindrical coordinate system of FIG. 7A demonstrating spatial terminology used in the present application.

FIG. 7B is a perspective view of object 90 in cylindrical coordinate system 80 of FIG. 7A demonstrating spatial terminology used in the present application. Cylindrical object 90 is representative of a cylindrical object in a cylindrical coordinate system and is not intended to limit the present invention is any manner. Object 90 includes axial surface 91, radial surface 92, and circumferential surface 93. Surface 91 is part of an axial plane, surface 92 is part of a radial plane, and surface 93 is part of a circumferential plane.

The terms "lockingly" and "slidingly" refer to relative movement between two objects, where "lockingly" is used to describe a condition in which two objects are engaged with one another to prevent movement relative to one another. "Slidingly" is used to describe a condition is which two objects are engaged with one another, wherein the objects move relative to one another and in contact throughout the relative movement. The term "rotationally lock" refers to relative rotation, wherein relative rotation of two objects is prevented due to the contact between the two objects.

Figure 8:
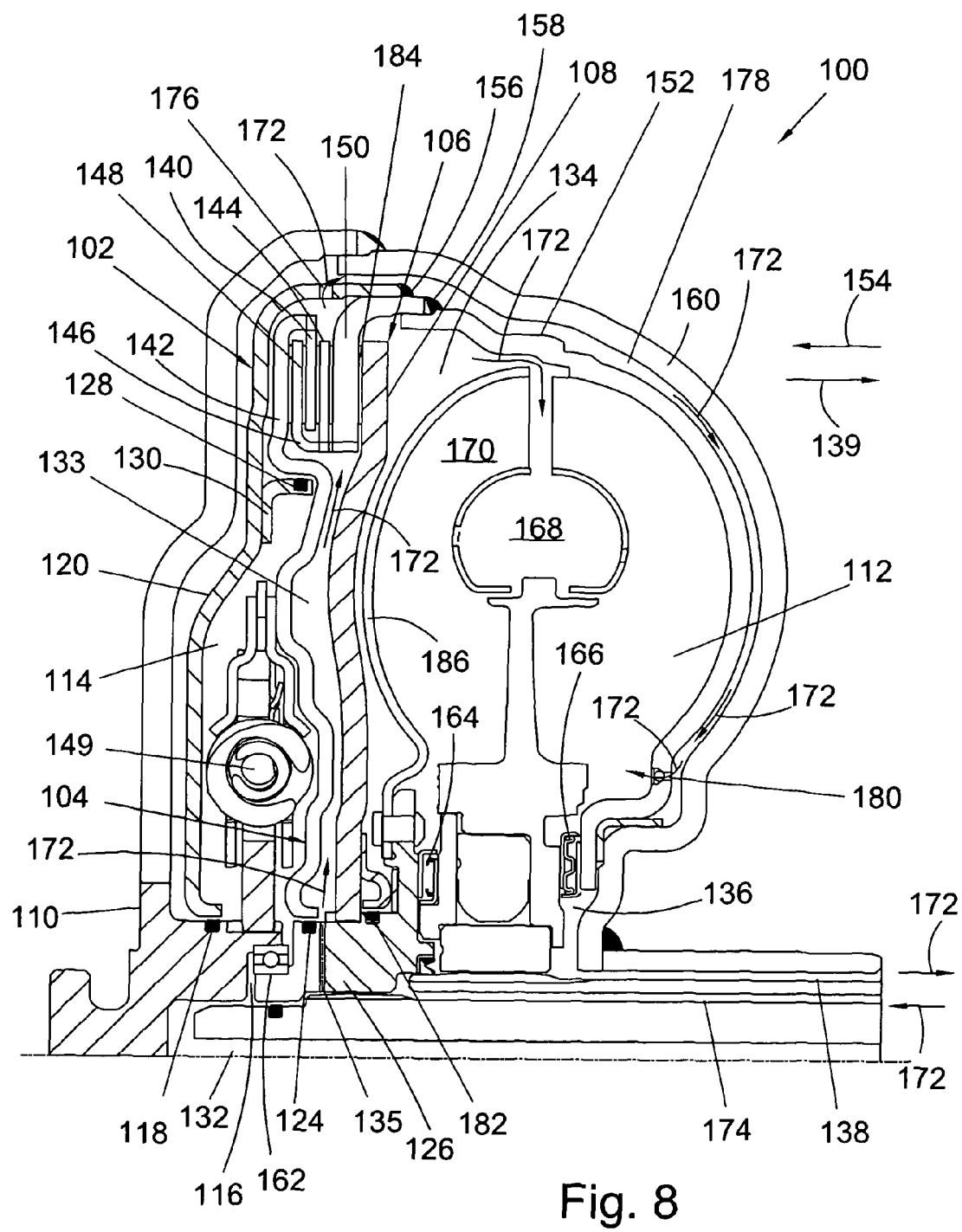
FIG. 8 is a partial cross-sectional view of a present invention torque converter with a sealed impeller clutch piston.

FIG. 8 is a partial cross-sectional view of present invention torque converter 100 with a sealed impeller clutch piston. Torque converter 100 includes impeller clutch 102, impeller piston plate 104, torque converter clutch 106, and lock-up piston plate 108. Clutch 102 is arranged to transmit torque from an input for the converter, for example, outer cover assembly 110, to impeller 112. It should be understood that torque can be input to converter 100 by any means known in the art. For example, in some aspects (not shown), a flex plate is connected to a cover for the torque converter and torque is transmitted through the flex plate to the cover.

Converter 100 also includes chamber 114, a portion or which is formed by plate 104. Chamber 114 is a sealed chamber with the exception of fluid channel 116. That is, chamber 114 is liquid-tight with the exception of channel 116 which is used to provide fluid flow in and out of the chamber (charge and vent the chamber). Chamber 114 is sealed by seal 118 between plate 120 and outer cover assembly 110, seal 124 between plate 104 and hub 126, and seal 128 between plates 104 and 130. Plate 130 is fixedly secured to plate 120 by any means known in the art, for example, welding or riveting. Channel 116 is connected to channel 132, which is arranged for connection to a pump (not shown), for example, a pump in a transmission to which the converter is connected. Plate 104 forms a portion of said sealed chamber. It should be understood that a sealed impeller piston for a present invention torque converter is not limited to the configuration shown in the figures and that other configurations, which enable the functions described, are included within the spirit and scope of the claimed invention.

Chamber 133 is partially formed by plates 104 and 108. Chamber 133 is vented and charged primarily via the fluid connection with chamber 134 through clutch 106. For example, as further described infra, in torque converter mode, clutch 106 is open, providing a relatively unrestricted fluid communication between chambers 133 and 134. Fluid flow to and from chamber 133 also is provided by channel 135 as further described infra. Fluid to and from chamber 134 is partially provided through channel 136, which is connected to channel 138, which is arranged for connection to the pump described supra.

The following is a description of the operation of converter 100 in torque converter mode. In torque converter mode, clutch 102 is engaged and clutch 106 is disengaged. Impeller piston plate 104 is arranged to operate the impeller clutch. Chamber 114 is charged, or pressurized, to a desired pressure level through channels 116 and 132 and pressure in chamber 133 is adjusted so that chamber 114 exerts an axial force in direction 139 on plate 104 and the pressure differential between chambers 114 and 133 is such that the net axial force on plate 104 in direction 139 is sufficient to impart a desired torque carrying capacity to clutch 102. That is, plate 104 is displaced in direction 139 to engage segment 142 of plate 104, plates 140, 144 and 146, and friction material 148 disposed between plates 104, 140, 144, and 146. The friction material 148 can be any type known in the art and can disposed among plates 104, 140, 144, and 146 in any way known in the art. Torque is transmitted from assembly 110 to damper 149, to plate 104, through clutch 102 to impeller ring 150, to impeller shell 152, which rotates impeller 112. As further described infra, clutch 106 remains open. It should be understood that clutch 102 is not limited to the number and configuration of components shown in the figures and that other numbers and configurations of components are included in the spirit and scope of the claimed invention.

Advantageously, torque converter 100 is configured to balance the axial forces associated with the pressurizing of chamber 114, for example, axial force on plate 104 in direction 139 and axial force on plate 120 in direction 154. That is, in general, plates 104 and 120 are interlocked, at least indirectly connected, or interconnected, to balance the axial forces. In some aspect, plate 120 is connected to impeller ring 150 by any means known in the art, including, but not limited to, weld 156. Ring 150, in turn, is connected to impeller shell 152 by any means known in the art, including, but not limited to, weld 158. Thus, the axial force exerted on plate 120 in direction 154 is transmitted to the ring. The axial force exerted on plate 104 in direction 139 is transmitted through clutch 102 to the ring. As is known, the pressurization of chamber 114 results in substantially equal and opposite axial forces on plates 104 and 120. Thus, these equal and opposite forces both react on the impeller ring and substantially cancel each other in the ring, balancing the forces. The effect of the axial forces on the structure of components in the torque converter, then, is limited to a ballooning condition of chamber 114.

Converter 100 includes respective pluralities of housing components and bearings. For example, in some aspects, the housing components include covers 110 and 160, and the bearings include bearings 162, 164, and 166. Advantageously, the housing components and bearings are isolated from the axial forces generated by charging chamber 114 by the balancing of the axial forces described supra. Thus, the configuration of the housing components can be made less robust, since the components are not subjected to the axial forces described supra, reducing the cost and complexity of the components. Further, the cost and complexity of the bearings can be reduced, since the bearings are not subjected to the additional thrust loads that would be imposed by the axial forces. That is, the load ratings of the bearings can be reduced. In addition, since the axial loads are balanced across the plates, the loads do not impart undesired force vectors that could affect the dynamics of the torque converter.

Considerable heat is generated in torus 168 of the converter during torque converter mode, since the impeller and turbine 170 are revolving at different rates. Advantageously, converter 100 is arranged to optimize cooling of the torus during operation in torque converter mode, while maintaining the desired torque carrying capacity for the impeller clutch. In some aspects, fluid circulation path 172 passes through chamber 133 and across clutch 106 (which is open) into chamber 134 and into the torus. From the torus, the path exits through channels 136 and 138 to a cooler (not shown). Fluid feeds into chamber 133 through channels 135 and 174. As noted supra, a minimum pressure differential is required between chambers 114 and 133 to obtain the desired torque carrying capacity for clutch 102. Advantageously, path 172 provides cooling flow to the torus while maintaining the desired pressure differential. Specifically, the configuration of the path prevents back pressure from building in chamber 133, which would undesirably reduce the pressure differential noted supra. In fact, the flow from chamber 133 into the torus tends to create a vacuum effect in chamber 133, lowering the pressure in chamber 133 and increasing the pressure differential noted supra. At the same time, the pressure in chamber 134 is kept low enough to keep clutch 106 open.

In some aspects, if additional flow for path 172 is desired or additional suction effect in chamber 133 is desired, path 172 is augmented by passages, or grooves (not shown), in friction material 148, passage 176, chamber 178, and check valve 180. That is, fluid flows from chamber 133 through the grooves in the friction material, through passage 176, and through chamber 178 and the check valve to chamber 134. Inside the torus, the fluid flow joins the path described supra. Advantageously, the flow through clutch 102 cools the clutch, improving operating conditions and the service life of the clutch.

To operate torque converter 100 in lock-up mode, pressure in chamber 114 is maintained to keep clutch 102 engaged and pressure in chamber 134 is increased while venting pressure in chamber 133. Thus, the differential pressure engaging clutch 102 is further increased and the pressure differential between chambers 133 and 134 exerts an axial force on plate 108 in direction 154, engaging clutch 106. Chamber 134 is partially sealed by seal 182. In some aspects, friction interface 184 (which can be connected to ring 150 or plate 108), is grooved to allow cooling flow through the friction interface, improving operating conditions and the service life of the clutch. Due to the venting of chamber 133 through channels 135 and 174 to the cooler, fluid is drawn from chamber 134 through clutch 106 to chamber 133.

To operate torque converter 100 in idle disconnect mode, fluid in chamber 114 is vented through channels 116 and 132, reducing pressure in the chamber, while keeping pressure in chamber 133 high. Chamber 134 is vented through channels 136 and 138. Thus, plate 104 is displaced in direction 154 and plate 108 is displaced in direction 139, opening clutches 102 and 106.

Figure 9:
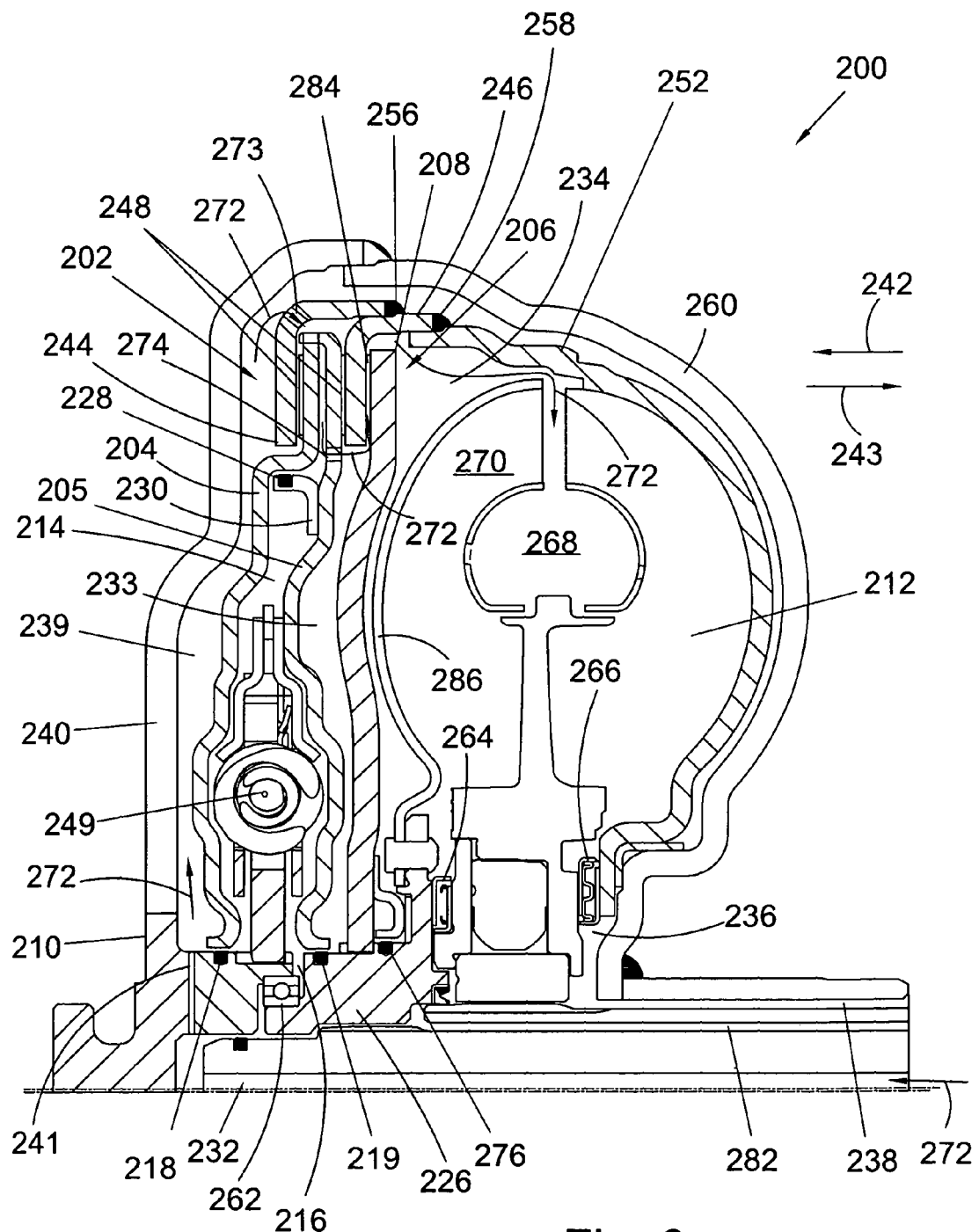
FIG. 9 is a partial cross-sectional view of a present invention torque converter with a sealed impeller clutch piston; and, FIG. 10 is a partial cross-sectional view of a present invention torque converter with a sealed torque converter clutch piston.

FIG. 9 is a partial cross-sectional view of present invention torque converter 200 with a sealed impeller clutch piston. Torque converter 200 includes impeller clutch 202, impeller piston plates 204 and 205, torque converter clutch 206, and lock-up piston plate 208. Clutch 202 is arranged to transmit torque from an input for the converter, for example, outer cover assembly 210, to impeller 212. It should be understood that torque can be input to converter 200 by any means known in the art. For example, in some aspects (not shown), a flex plate for the torque converter is connected to the cover and torque is transmitted through the flex plate to the cover.

Converter 200 also includes chamber 214, a portion or which is formed by plates 204 and 205. Chamber 214 is a sealed chamber with the exception of fluid channel 216. That is, chamber 214 is liquid-tight with the exception of channel 216 which is used to provide fluid flow in and out of the chamber (charge and vent the chamber). Chamber 214 is sealed by seal 218 between plate 204 and outer cover assembly 210, seal 219 between plate 205 and hub 226, and seal 228 between plates 204 and 230. Plate 230 is fixedly secured to plate 205 by any means known in the art, for example, welding or riveting. Channel 216 is connected to channel 282, which is arranged for connection to a pump (not shown), for example, a pump in a transmission to which the converter is connected. Plates 204 and 205 form a portion of the sealed chamber. It should be understood that a sealed impeller piston for a present invention torque converter is not limited to the configuration shown in the figures and that other configurations, which enable the functions described, are included within the spirit and scope of the claimed invention.

Chamber 233 is partially formed by plates 205 and 208. Chamber 233 is vented and charged primarily via the fluid connection with chamber 234 through clutch 206. For example, as further described infra, in torque converter mode, clutch 206 is open, providing a relatively unrestricted fluid communication between chambers 233 and 234. Fluid to and from chamber 234 is partially provided through channel 236, which is connected to channel 238, which is arranged for connection to the pump as described supra. Chamber 239 is at least partly formed by plate 204 and cover 240 and is charged and vented through channel 241, which is connected to channel 232.

The following is a description of the operation of converter 200 in torque converter mode. In torque converter mode, clutch 202 is engaged and clutch 206 is disengaged. Impeller piston plates 204 and 205 are arranged to operate the impeller clutch. Chamber 214 is charged, or pressurized, to a desired pressure level through channel 216. Respective pressures in chambers 233 and 239 are adjusted so that chamber 214 exerts an axial force in direction 242 on plate 204 and an opposite axial force on plate 205 in direction 243. The respective pressure differentials between chamber 214 and chambers 233 and 239 respectively, are such that the net axial forces on plates 204 and 205, in directions 242 and 243, respectively, is sufficient to impart a desired torque carrying capacity to clutch 202. That is, plates 204 and 205 are displaced to engage impeller rings 244 and 246, respectively, and friction material 248 disposed between plates 204 and 205, and rings 244 and 246. The friction material can be any type known in the art and can disposed among plates 204 and 205, and rings 244 and 246 in any way known in the art. Torque is transmitted from assembly 210 to damper 249, to plate 205 (which is connected to plate 204 at an outer circumference of the plates), through clutch 202 to the impeller rings, to impeller shell 252, which rotates impeller 212. As further described infra, clutch 206 remains open. It should be understood that clutch 202 is not limited to the number and configuration of components shown in the figures and that other numbers and configurations of components are included in the spirit and scope of the claimed invention.

Advantageously, torque converter 200 is configured to balance the axial forces associated with the pressurizing of chamber 214, for example, axial force on plate 204 in direction 242 and axial force on plate 205 in direction 243. That is, in general, plates 204 and 205 are interlocked, interconnected, or at least indirectly connected, to balance the axial forces. Impeller ring 244 is connected to ring 246 by any means known in the art, including, but not limited to, weld 256. Ring 246, in turn, is connected to impeller shell 252 by any means known in the art, including, but not limited to, weld 258. Thus, rings 244 and 246 form a solid, connected unit. The axial force exerted on plate 205 in direction 243 is transmitted to ring 246 and the axial force exerted on plate 204 in direction 242 is transmitted to ring 244. As is known, the pressurization of chamber 214 results in substantially equal and opposite axial forces on plates 204 and 205. Thus, these equal and opposite forces both react on the impeller rings and substantially cancel each other in the rings, balancing the forces. The effect of the axial forces on the structure of components in the torque converter, then, is limited to a ballooning condition of chamber 214.

Converter 200 includes respective pluralities of housing components and bearings. For example, in some aspects, the housing components include covers 240 and 260, and the bearings include bearings 262, 264, and 266. Advantageously, the axial forces generated by charging chamber 214 are isolated from the housing components and bearings by the balancing of the axial forces described supra. Thus, the configuration of the housing components can be made less robust, since the components are not subjected to the axial forces described supra, reducing the cost and complexity of the components. Further, the cost and complexity of the bearing can be reduced, since the bearings are not subjected to the additional thrust loads that would be imposed by the axial forces. That is, the load ratings of the bearings can be reduced. In addition, since the axial loads are balanced across the plates, the loads do not impart undesired force vectors that could affect the dynamics of the torque converter.

Considerable heat is generated in torus 268 of the converter during torque converter mode, since the impeller and turbine 270 are revolving at different rates. Advantageously, converter 200 is arranged to optimize cooling of the torus during operation in torque converter mode. In some aspects, fluid circulation path 272 passes through chamber 239, through passage 273, across clutch 202 through grooves (not shown) in friction material 248, through passage 274, through clutch 206 (which is open) into chamber 234 and into the torus.

Advantageously, the flow through clutch 202 cools the clutch, improving operating conditions and the service life of the clutch.

From the torus, the path exits through channels 236 and 238 to a cooler (not shown). Fluid feeds into chamber 239 through channel 241 and 232. As noted supra, a minimum pressure differential is required between chamber 214 and chambers 233 and 239 respectively, to obtain the desired torque carrying capacity for clutch 202. Advantageously, path 272 provides cooling flow to the torus while maintaining the desired pressure differential. Specifically, the configuration of the path prevents back pressure from building in chambers 233 and 239, which would undesirably reduce the pressure differential noted supra. In fact, the flow from chambers 233 and 239 into the torus tends to create a vacuum effect in chambers 233 and 239, lowering the pressure in chambers 233 and 239 and increasing the pressure differential noted supra. At the same time, the pressure in chamber 234 is kept low enough to keep clutch 206 open.

In some aspects, passages 273 and 274 are not included and fluid passes from chamber 239 to chamber 233 through grooves in friction material 248.

To operate torque converter 200 in lock-up mode, pressure in chamber 214 is maintained to keep clutch 202 engaged and pressure is chamber 234 is increased while venting pressure in chamber 233 (through clutch 202, chamber 239, and channel 241). Thus, the differential pressure engaging clutch 202 is further increased and the pressure differential between chambers 233 and 234 exerts an axial force on plate 208 in direction 242, engaging clutch 206. Chamber 234 is partially sealed by seal 276. In some aspects, friction interface 284 (which can be connected to ring 246 or plate 208), is grooved to allow cooling flow through the friction interface, improving operating conditions and the service life of the clutch. Due to the venting of chamber 233, fluid is drawn from chamber 234 through clutch 206 to chamber 233.

To operate torque converter 200 in idle disconnect mode, fluid in chamber 214 is vented through channel 216, reducing pressure in the chamber. Chamber 239 is charged through channels 241 and 232 to raise the pressure in the chamber. Fluid flows through clutch 202 (and openings 273 and 274 if present) to charge chamber 233 as well. Fluid discharges from chamber 234 through channels 236 and 238. Thus, plates 204 and 205 are displaced in directions 243 and 242, respectively, opening clutch 202, and plate 208 is displaced in direction 243, opening clutch 206.

Figure 10:
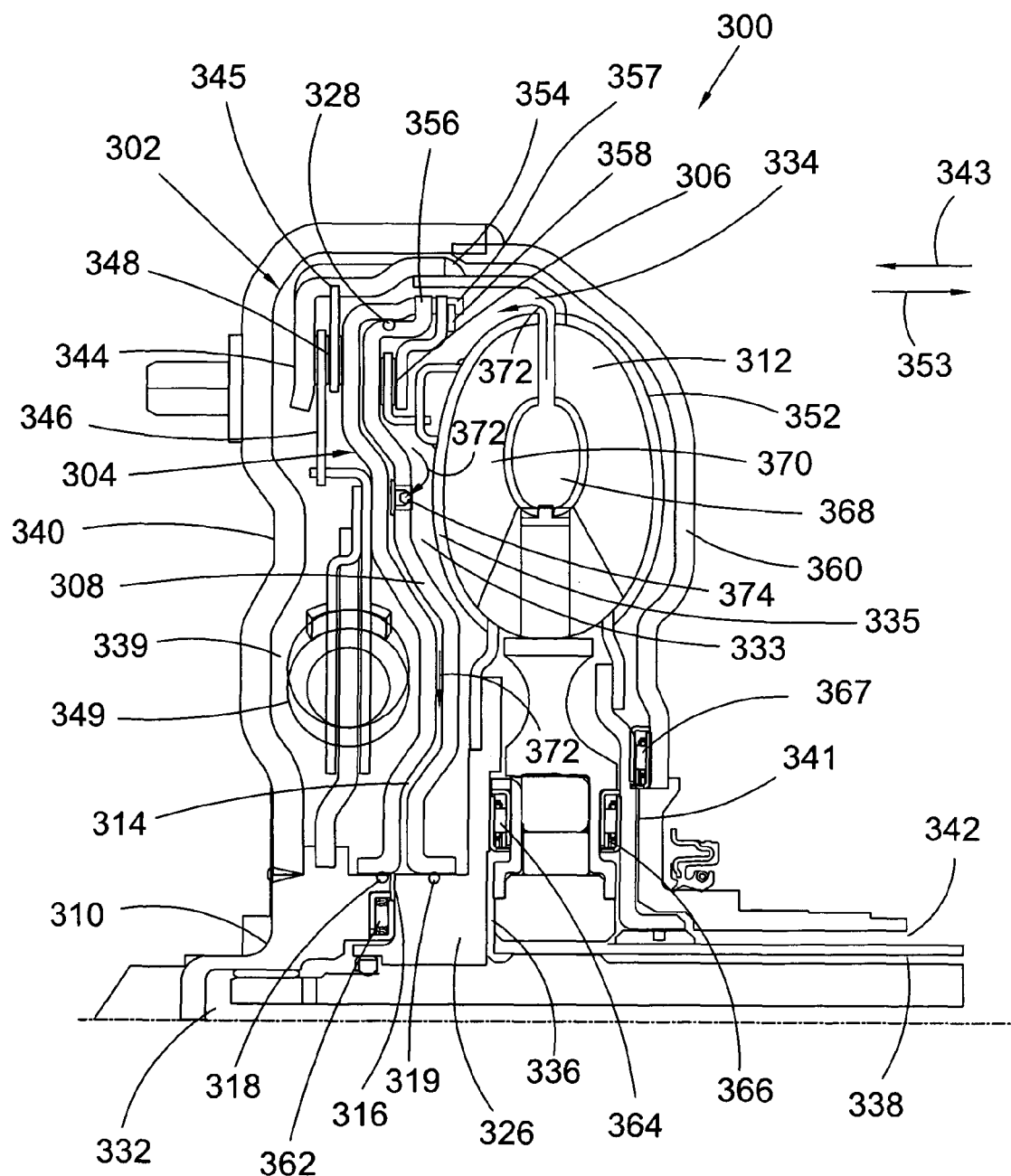

FIG. 10 is a partial cross-sectional view of present invention torque converter 300 with a sealed torque converter clutch piston. Torque converter 300 includes impeller clutch 302, impeller piston plate 304, torque converter clutch 306, and lock-up piston plate 308. Clutch 302 is arranged to transmit torque from an input for the converter, for example, outer cover assembly 310, to impeller 312. It should be understood that torque can be input to converter 300 by any means known in the art. For example, in some aspects (not shown), a flex plate for the torque converter is connected to the cover and torque is transmitted through the flex plate to the cover.

Converter 300 also includes chamber 314, a portion or which is formed by plates 304 and 308. Chamber 314 is a sealed chamber with the exception of fluid channel 316. That is, chamber 314 is liquid-tight with the exception of channel 316 which is used to provide fluid flow in and out of the chamber (charge and vent the chamber). Chamber 314 is sealed by seal 318 between plate 304 and outer cover assembly 310, seal 319 between plate 308 and hub 326, and seal 328 between plates 304 and 308. Channel 316 is connected to channel 332, which is arranged for connection to a pump (not shown), for example, a pump in a transmission to which the converter is connected. Plates 304 and 308 form a portion of the sealed chamber. It should be understood that a sealed impeller or torque converter piston for a present invention torque converter is not limited to the configuration shown in the figures and that other configurations, which enable the functions described, are included within the spirit and scope of the claimed invention.

Chamber 333 is partially formed by plates 308 and turbine cover 335. Chamber 333 is vented and charged primarily via the fluid connection with chamber 334 through clutch 306. Chambers 333 and 334 are in fluid communication. Fluid to and from chamber 334 is partially provided through channel 336, which is connected to channel 338, which is arranged for connection to the pump as described supra. Chamber 339 is at least partly formed by plate 304 and cover 340 and is charged and vented through channel 341, which is connected to channel 342.

The following is a description of the operation of converter 300 in torque converter mode. In torque converter mode, clutch 302 is engaged and clutch 306 is disengaged. Plate 304 is arranged to operate the impeller clutch. Chamber 314 is charged, or pressurized, to a desired pressure level through channel 316. The pressure in chamber 339 is vented so that chamber 314 exerts an axial force in direction 343 on plate 304. The pressure in chambers 333 and 334 is kept higher, and the pressure in chamber 333 is substantially equal to the pressure in chamber 314, keeping clutch 306 open. The respective pressure differential between chamber 314 and chamber 339 is such that the net axial force on plate 304, in direction 343, respectively, is sufficient to impart a desired torque carrying capacity to clutch 302. That is, plate 304 is displaced to engage impeller ring 344, plates 345 and 346, and friction material 348 disposed between plates 304, 345, and 346, and ring 344. The friction material can be any type known in the art and can disposed among plates 304, 345, and 346, and ring 344 in any way known in the art. Torque is transmitted from assembly 310 to damper 349, to clutch 302 and ring 344 to impeller shell 352, which rotates impeller 312. Impeller ring 344 is connected to shell 352 by any means known in the art, including, but not limited to, weld 354. As further described infra, clutch 306 remains open. It should be understood that clutch 302 is not limited to the number and configuration of components shown in the figures and that other numbers and configurations of components are included in the spirit and scope of the claimed invention.

Advantageously, torque converter 300 is configured to balance the axial forces associated with the operation of the torque converter in torque converter mode. For example, pressurizing chamber 314 generates an axial force on plate 304 in direction 343. Further, as noted above, chamber 339 is vented and pressure in chambers 333 and 334 is kept high. Thus, the pressure differential between chambers 333 and 334 and chamber 339 push impeller shell 352 in direction 353. Impeller ring 344 is connected to shell 352 by any means known in the art, for example, weld 354. Thus, the axial force on plate 304 is transferred to ring 344 through clutch 302. As noted supra, the pressure differential between chambers 333 and 334 and chamber 339 pushes impeller shell 352 in direction 353, generating an equal and opposite force (with respect to the axial force imposed on plate 304) on ring 352. Thus, the force on plate 305 and the force generated by the pressure differential between chambers 333 and 334 and chamber 339 are both reacted on ring 352 and balance each other across the ring.

In some aspects, plate 308 is axially and slidingly engaged with plate 304, for example, segment 356 of plate 308 is axially and slidingly engaged with segment 357 of plate 304. Thus, the plates have some ability to axially displace with respect to each other as the pressure in chamber 314 is varied. However, the respective axial movement of the plates is restricted. In some aspects, torque converter 300 includes snap ring 358 on plate 304. Ring 358 blocks the movement of plate 308 in direction 353.

Converter 300 includes respective pluralities of housing components and bearings. For example, in some aspects, the housing components include covers 340 and 360, and the bearings include bearings 362, 364, 366, and 367. Advantageously, the axial forces generated by charging chamber 314 are isolated from the housing components and bearings by the balancing of the axial forces described supra. Thus, the configuration of the housing components can be made less robust, since the components are not subjected to the axial forces described supra, reducing the cost and complexity of the components. Further, the cost and complexity of the bearing can be reduced, since the bearings are not subjected to the additional thrust loads that would be imposed by the axial forces. That is, the load ratings of the bearings can be reduced. In addition, since the axial loads are balanced across the plates, the loads do not impart undesired force vectors that could affect the dynamics of the torque converter.

Considerable heat is generated in torus 368 of the converter during torque converter mode, since the impeller and turbine 370 are revolving at different rates. Advantageously, converter 300 is arranged to optimize cooling of the torus during operation in torque converter mode. In some aspects, fluid circulation path 372 flows from the torus through chamber 333, through clutch one-way opening 374 into chamber 314. Opening 374 only allows flow from chamber 334 to chamber 314, and blocks flow from chamber 314 to chamber 334. Path 372 enters the torus from channels 338 and 336 and the path exits chamber 314 through channels 316 and 332. Opening 374 can be any one-way opening known in the art. In some aspects, opening 374 is a check valve.

As noted supra, a minimum pressure differential is required between chambers 314 and 339 to obtain the desired torque carrying capacity for clutch 302. Advantageously, path 372 provides cooling flow to the torus while maintaining the desired pressure differential. At the same time, the pressure in chamber 334 is kept high enough to keep clutch 306 open.

To operate torque converter 300 in lock-up mode, pressure in chamber 314 is increased, pressure in chamber 339 is vented, and pressure is chamber 334 is made greater than the pressure in chamber 339 and less than the pressure in chamber 314. Thus, the differential pressure engaging clutch 302 is further increased and the pressure differential between chambers 314 and 334 exerts an axial force on plate 308 in direction 353, engaging clutch 306. In some aspects, friction interface 348 is grooved to allow cooling flow through the friction interface, improving operating conditions and the service life of the clutch. Due to the venting of chamber 339, fluid is drawn from chamber 334 through clutch 302 to chamber 339.

To operate torque converter 300 in idle disconnect mode, fluid in chamber 314 is vented through channels 316 and 332, reducing pressure in the chamber. Chamber 339 is charged through channels 341 and 342 to raise the pressure in the chamber and chamber 334 is charged through channels 336 and 338 to raise the pressure in the chamber. Thus, plates 304 and 308 are displaced in directions 353 and 343, respectively, opening clutches 302 and 306. In some aspects, an axial stop (not shown) on piston 304 prevents plate 304 from applying clutch 306 in idle disconnect mode.

The following discussion is applicable to FIGS. 8 through 10. As noted supra, unsealed pistons for clutches in a torque converter can present controllability issues. Advantageously, sealed chambers are used in a present invention torque converter to provide more precise and repeatable control of respective clutches. For example, chambers 114, 214, and 314, in FIGS. 8, 9, and 10, respectively, are sealed and enable more precise control of clutch 102, 202, and 302, respectively. Specifically, since the volume of a sealed chamber is known, the pressure changes in the chamber due to a specific volume fluid at a specific pressure and temperature can be accurately predicted. Further and advantageously, hydrodynamic effects of surrounding components that would be in fluid communication with the chamber if the chamber were not sealed, can be eliminated. For example, these effects may not be readily predictable, hindering the execution of appropriate fluid control, and even if predictable, these effects may undesirably slow down the operation of the clutch.

The cooling described supra for clutches 102, 202, and 302 can be particularly advantageous during launch events or clutch control sequences involving slipping, or partial engagement, of a clutch. For example, such events or control sequences are described in commonly owned, and therefore, uncitable U.S. patent application Ser. No. 11/637,639 titled "METHOD AND SYSTEM FOR CONTROLLING ENGINE SPEED, ENGINE TORQUE AND OUTPUT FROM A TORQUE CONVERTER," filed Dec. 12, 2006; and in commonly owned, and therefore uncitable, U.S. Provisional Patent Application No. 60/876,650, titled "METHOD OF OPERATING A CLUTCH DURING A VEHICLE LAUNCH," filed Dec. 22, 2006.

The present invention includes a method of forming and operating a multi-function torque converter. A first step forms a first portion of a sealed fluid-containing chamber with at least one impeller piston plate for an impeller clutch and a second step pressurizes the sealed chamber to engage the impeller clutch. In general, the torque converter includes respective pluralities of housing components and bearings and the second step generates a plurality of axial forces. Then, a third step isolates the respective pluralities of housing components and bearings from the plurality of axial forces, or a fourth step balances the plurality of axial forces. In some aspects, the torque converter includes a plate and a fifth step forms a second portion of the sealed chamber with the plate, the second step generates first and second axially opposing forces on the plate and the at least one impeller plate, respectively, and the fourth step includes balancing the first and second axial forces across the plate and the at least one impeller plate.

In some aspects, the torque converter includes a connecting element, a sixth step connects the plate to the connecting element, and the fourth step includes transmitting the second axial force through the impeller clutch to the connecting element. In some aspects, the at least one impeller plate includes first and second impeller plates, a seventh step forms a third portion of the sealed chamber with the first and second impeller plates, and the fourth step balances the first and second axial forces across the first and second impeller plates.

In general, the torque converter includes a torus and in some aspects, also includes at least one fluid-containing chamber. Then, an eighth step pressurizes the sealed chamber and the at least one fluid-containing chamber to generate a pressure differential between the sealed chamber and the at least one fluid-containing chamber, the pressure differential having a value, or level, necessary to operate the impeller clutch with a desired torque carrying capacity, and a ninth step circulates fluid through the torus and the at least one fluid-containing chamber to cool the torus while maintaining the pressure differential. In some aspects, the ninth step isolates the circulating fluid from the sealed chamber.

The present invention includes another method of forming and operating a multi-function torque converter. A first step forms a first portion of a first fluid-containing chamber from a lock-up piston plate for a torque converter clutch. A second step forms a portion of a second fluid-containing chamber with the lock-up plate. A third step seals the first chamber to be liquid-tight for a first pressure level inside the first chamber greater than a second pressure level in the second chamber, with the exception of a channel arranged for fluid communication with a pump. A fourth step adjusts pressure in the first chamber to a third pressure level associated with operation of the torque converter in a torque converter mode. A fifth step circulates fluid from a torus for the torque converter through the second chamber and the lock-up plate to the first chamber. A sixth step maintains pressure in the first chamber at the third pressure level.

In some aspects, the torque converter includes an impeller clutch and a seventh step radially aligns at least one of the torque converter clutch and the impeller clutch so that the torque converter clutch is at least partially axially aligned with the impeller clutch. In some aspects, the impeller clutch includes an impeller piston plate and an eighth step forms a second portion of the first chamber with the impeller piston plate, a ninth step imposes an axial force on the impeller piston plate by adjusting the pressure in the first chamber, a tenth step adjusts pressure in the at least one second chamber to create a pressure differential between the first chamber and the at least one second chamber, and a tenth step balances the axial force with the pressure differential. In general, the torque converter includes respective pluralities of housing components and bearings and step ten includes isolating the respective pluralities of housing components and bearings from the axial force.

The present invention includes a further method of forming and operating a multi-function torque converter. A first step forms at least a portion of a fluid-containing chamber with a combination of one or more of at least one piston plate for an impeller clutch and a plate. A second step pressurizes the chamber to engage the impeller clutch. A third step at least indirectly connects the combination of one or more of the at least one impeller plate and the plate. A fourth step balances axial forces, among the combination of one or more of the at least one impeller plate and the plate, generated by pressurization of the chamber.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. A multi-function torque converter comprising:
a hub forming an output for the torque converter;
an impeller;
an impeller clutch arranged to transmit torque from a cover for the torque converter to the impeller;
at least one impeller piston plate for said impeller clutch axially displaceable in a first direction away from the impeller to open the impeller clutch and axially displaceable in a second direction toward the impeller to close the impeller clutch;
a plate at least indirectly connected to the impeller to rotate in unison with the impeller;
an impeller ring connected to the impeller shell such that movement of the impeller ring is fixed to movement of the impeller shell;
a torque converter clutch arranged to transmit torque from a torque output to the hub via the impeller ring when closed; and,
a fluid-containing chamber, wherein said chamber is at least partially formed by said at least one impeller piston plate and said plate, wherein:
when the at least one piston plate axially displaces in the second direction and closes the impeller clutch a first force from the at least one piston plate is transmitted through the impeller ring to the impeller shell in the second direction;
when the at least one piston plate axially displaces in the second direction and closes the impeller clutch, fluid in the sealed fluid-containing chamber applies a second force in the first direction on the plate and the plate applies the second force to the impeller shell in the first direction via the impeller ring;
said chamber is arranged to be pressurized to engage said impeller clutch, and
said at least one impeller piston plate and said plate are at least indirectly connected to balance axial forces generated by pressurization of said chamber.

2. A multi-function torque converter comprising:
a first cover arranged to receive torque;
a second cover directly connected to the first cover so that rotation of the second cover is fixed to rotation of the first cover;
an impeller, enclosed by the first and second covers, including an impeller shell;
an impeller clutch, enclosed by the first and second covers, arranged to transmit torque from a torque input for the torque converter to the impeller shell;
at least one impeller piston plate for said impeller clutch, enclosed by the first and second covers, the at least one impeller piston plate axially displaceable to open and close the impeller clutch;
a damper, enclosed by the first and second covers, with an output component connected with an input for the impeller clutch such that rotation of the output component is fixed to rotation of the input;
a first plate:
enclosed by the first and second covers;
at least indirectly connected to the impeller shell to rotate with the impeller shell whenever the impeller shell rotates;
including a portion axially disposed between the first cover and the at least one impeller piston plate; and,
rotatable with respect to the at least one piston plate when the impeller clutch is open;
a second plate:
enclosed by the first and second covers;
at least indirectly connected to the impeller shell and the first plate to rotate with the impeller shell and the first plate whenever the impeller shell and the first plate rotate;
including a portion axially disposed between the second cover and the at least one impeller piston plate; and,
rotatable with respect to the at least one impeller piston plate when the impeller clutch is open; and,
a sealed fluid-containing chamber, enclosed by the first and second covers, said sealed chamber liquid-tight when the impeller clutch is open with the exception of a channel arranged for connection to a pump, wherein:

the impeller shell and the first and second plates are all rigidly fixed to each other;

the portion of the first plate is axially disposed between the first cover and the second plate;

the first and second covers form a continuous surface with the exception of an opening facing an axis of rotation for the torque converter;

said at least impeller piston plate and the first plate form at least a portion of said sealed chamber;

pressure in the sealed chamber is arranged to displace the at least one impeller piston plate to close the impeller clutch; and, the damper is fully located within the sealed fluid-containing chamber.

3. The multi-function torque converter of claim 2 wherein said torque converter is arranged to balance first and second axial forces, respectively, generated by pressurization of said sealed chamber.

4. The multi-function torque converter of claim 3 wherein said first plate and said at least one impeller piston plate are arranged to balance said first and second axial forces, respectively.

5. The multi-function torque converter of claim 3 wherein said first plate and said at least one impeller piston plate are arranged to balance said first and second axial forces, respectively.

6. The multi-function torque converter of claim 2 further comprising respective pluralities of housing components and bearings and wherein said chamber is arranged to isolate said respective pluralities of housing components and bearings from axial force generated by pressure in said chamber.

7. The multi-function torque converter of claim 2 further comprising a torus, at least one fluid-containing chamber, and a fluid circulation path passing through said torus and said least one fluid-containing chamber, wherein in a torque converter mode for said torque converter, a pressure difference between said sealed chamber and said least one fluid-containing chamber operates to close said impeller clutch with a specified torque carrying capacity and wherein said torque converter is arranged to maintain said pressure difference as fluid flows through said fluid circulation path.

8. The multi-function torque converter of claim 2 further comprising a torus and a fluid circulation path passing through said torus and wherein said fluid circulation path is isolated from said sealed chamber.

9. A multi-function torque converter comprising:

a first cover arranged to receive torque;

a second cover directly connected to the first cover so that rotation of the second cover is fixed to rotation of the first cover;

an impeller, enclosed by the first and second covers, including an impeller shell;

an impeller clutch, enclosed by the first and second covers, arranged to transmit torque from a torque input for the torque converter to the impeller shell;

at least one impeller piston plate for said impeller clutch, enclosed by the first and second covers, the at least one impeller piston plate axially displaceable to open and close the impeller clutch;

a damper, enclosed by the first and second covers, with an output component connected with an input for the impeller clutch such that rotation of the output component is fixed to rotation of the input;

a first plate:
  enclosed by the first and second covers;
  at least indirectly connected to the impeller shell to rotate with the impeller shell whenever the impeller shell rotates;
  including a portion axially disposed between the first cover and the at least one impeller piston plate; and,
  rotatable with respect to the at least one piston plate when the impeller clutch is open;

a second plate:
  enclosed by the first and second covers;
  at least indirectly connected to the impeller shell and the first plate to rotate with the impeller shell and the first plate whenever the impeller shell and the first plate rotate;
  including a portion axially disposed between the second cover and the at least one impeller piston plate; and,
  rotatable with respect to the at least one impeller piston plate when the impeller clutch is open; and, a sealed fluid-containing chamber, enclosed by the first and second covers, said sealed chamber liquid-tight when the impeller clutch is open with the exception of a channel arranged for connection to a pump, wherein:

the first and second covers form a continuous surface with the exception of an opening facing an axis of rotation for the torque converter;

said at least impeller piston plate and the first plate form at least a portion of said sealed chamber;

pressure in the sealed chamber is arranged to displace the at least one impeller piston plate to close the impeller clutch;

the damper is axially located between the first plate and the at least one impeller piston plate; and, the damper is fully located within the sealed fluid-containing chamber.

* * * * *